July 28, 1964 C. M. WINE 3,142,765

TUNNEL DIODE VOLTAGE MULTIPLIER

Filed Dec. 28, 1960

INVENTOR.
Charles M. Wine
BY
Carl V. Olson
ATTORNEY

United States Patent Office 3,142,765
Patented July 28, 1964

3,142,765

TUNNEL DIODE VOLTAGE MULTIPLIER

Charles M. Wine, Princeton, N.J., assignor to Radio Corporation of America, a corporation of Delaware Filed Dec. 28, 1960, Ser. No. 79,052
9 Claims. (Cl. 307—88.5)

This invention relates to voltage multipliers, and more particularly to a circuit, including a plurality of negative resistance diodes such as tunnel diodes, to which a trigger pulse may be applied to cause the generation of an output voltage greater than can be supplied by a single tunnel diode. By way of example only, the invention is useful in high speed electronic computers.

Tunnel diodes have a current-voltage characteristic comprising a low voltage, positive resistance region, an intermediate voltage, negative resistance region, and a high voltage, positive resistance region. The operating point of a tunnel diode can be very rapidly switched between its low voltage region and its high voltage region in a bistable or a monostable manner. The high switching speed of a tunnel diode makes it attractive for use in high speed electronic pulse systems, such as are employed in computers.

In electronic systems employing tunnel diodes, it is sometimes desired to generate a controlled pulse or voltage level having a voltage value greater than can be provided by the high voltage state of a single tunnel diode. It is therefore a general object of this invention to provide an improved circuit, including tunnel diodes, for generating a voltage pulse or voltage level greater than can be provided by a single tunnel diode.

It is another object of this invention to provide an improved tunnel diode voltage multiplier.

It is a further object to provide an improved circuit for translating an input signal to an output signal of much greater voltage amplitude.

In one aspect the invention comprises a voltage multiplier comprising a plurality of tunnel diodes having direct current conduction means including inductance elements interposed between the diodes to connect them in series. A direct current bias is applied to the diodes through the direct current conduction means to bias each of the diodes in one of their states, say the low voltage state. The tunnel diodes are also connected in parallel by means of alternating current or dynamic conduction paths including direct current blocking capacitors. A trigger pulse is applied to the tunnel diodes through the alternating current conduction paths to trigger the diodes to their high voltage states. An output voltage is obtained from across the direct current conduction means connecting the tunnel diodes in series, the output voltage being substantially the sum of the voltages across the individual tunnel diodes. The voltage multiplier may be operated in a bistable manner to provide an output voltage that exists so long as the direct current bias is applied, or may be operated in a monostable manner to provide an output pulse having a duration determined by the values of the inductive and resistive circuit elements.

Figure 1:
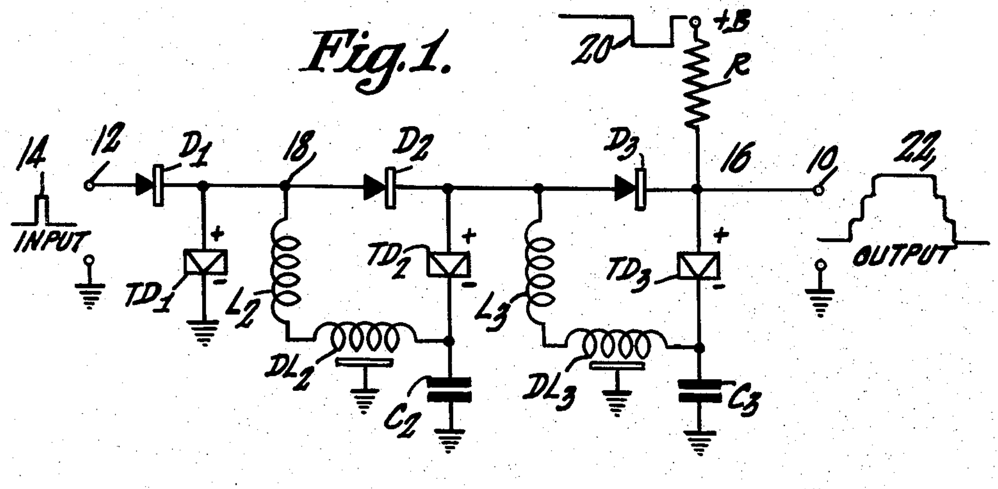
Figure 2:
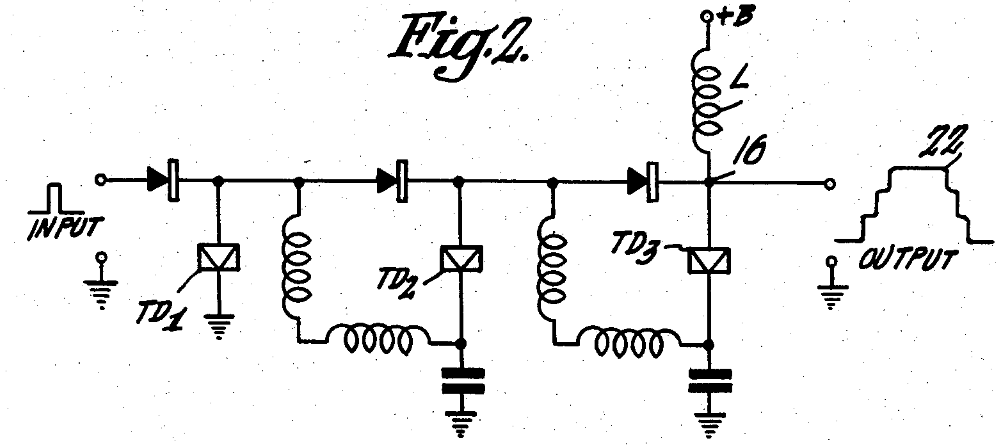
Figure 3:
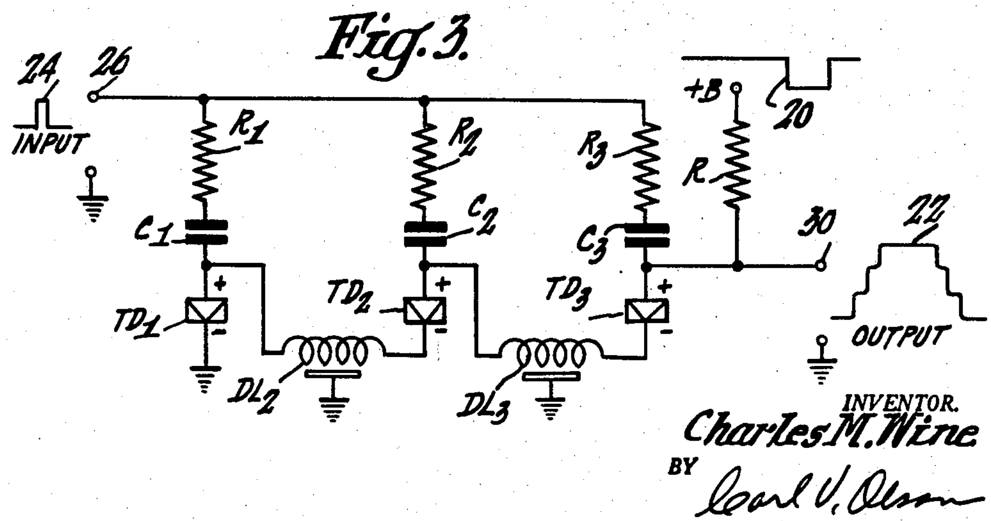

These and other objects and aspects of the invention will be apparent to those skilled in the art from the following more detailed description taken in conjunction with the appended drawings, wherein:

FIGURE 1 is a circuit diagram of a voltage multiplier circuit constructed according to the teachings of the invention and arranged to operate in the bistable mode to provide a multiplied output voltage that exists so long as the direct current bias is supplied to the circuit;

FIGURE 2 is a circuit diagram of another voltage multiplier arranged for monostable operation to provide an output voltage signal having a duration determined by the values of the inductive and resistive circuit elements; and FIGURE 3 is a circuit diagram of another embodiment of the invention which requires an input trigger pulse of higher current value than is required by the circuits of FIGURES 1 and 2.

The voltage multiplier circuit of FIGURE 1 includes a plurality of tunnel diodes represented by the three tunnel diodes $TD_1$, $TD_2$ and $TD_3$. The tunnel diodes are connected together in series circuit by means of direct current conduction means including inductors and delay lines. The direct current conduction path may be traced from the output terminal 10 through the following circuit elements: tunnel diode $TD_3$, delay line $DL_3$, inductor $L_3$, tunnel diode $TD_2$, delay line $DL_2$, inductor $L_2$, and tunnel diode $TD_1$ to ground. A short circuiting of the direct current conduction path is prevented by the direct current blocking capacitors $C_2$ and $C_3$ connected from the negative terminals of tunnel diode $TD_2$ and tunnel diode $TD_3$, respectively, to ground. A short circuiting of the positive terminals of the tunnel diodes so far as direct current is concerned is prevented by a conventional conduction diode $D_2$ interposed between tunnel diodes $TD_1$ and $TD_2$, and by a conventional coupling diode $D_3$ interposed between the positive terminals of tunnel diodes $TD_2$ and $TD_3$. Another conventional conduction diode $D_1$ is interposed between the input terminal 12 and the positive terminal of tunnel diode $TD_1$. The conduction diode $D_1$ may or may not be required depending on the nature of the input trigger pulse source (not shown) coupled to the input terminal 12.

The conduction diodes $D_1$, $D_2$ and $D_3$ do not short circuit the direct current series connection of the tunnel diodes because they are selected and poled to present a very high impedance (to be substantially nonconducting) in the absence of an input trigger pulse 14 applied to input terminal 12. The reverse bias for the conduction diodes $D_1$, $D_2$ and $D_3$ is provided by the positive direct current bias applied to the +B terminal, through the resistor R and the junction point 16 to the direct current conductive means connecting the three tunnel diodes in series. The direct current bias flowing from the +B terminal through the series connected tunnel diodes is selected to have a value such that all of the tunnel diodes are biased to an operating point in the low voltage positive resistance region of their characteristic curves, which may in the case of gallium arsenide tunnel diodes, be about 170 millivolts. Each conduction diode is connected across a tunnel diode so far as direct current is concerned, and it is therefore back-biased the same amount, namely about 170 millivolts. The conduction diodes may conveniently be constituted by germanium conduction diodes. Other combinations of types of tunnel diodes and conduction diodes may be employed. Also, resistors may be substituted for the conduction diodes at some sacrifice in available output current.

The tunnel diodes, in addition to being connected in series for direct current, are connected in parallel with the input terminal 12 for alternating current or dynamic conditions. The input terminal 12 is connected to all of the tunnel diodes in parallel through the conduction diodes $D_1$, $D_2$ and$D_3$, and through the capacitors $C_2$ and $C_3$. The tunnel diodes $TD_1$, $TD_2$ and $TD_3$ are connected in parallel within the meaning of the term as used herein although, as will appear, the conduction diodes $D_1$, $D_2$ and $D_3$ are not all instantly conductive when an input pulse is applied to the input terminal 12.

In the operation of the voltage multiplier circuit of FIGURE 1, the tunnel diodes are initially in their low voltage states and the voltage at the output terminal 10 is the sum of the low state voltages across the individual tunnel diodes. A positive input pulse 14 applied to the input terminal 12 has a polarity to render the conduction diode $D_1$ conductive so that the input pulse appears across the first tunnel diode $TD_1$. The tunnel diode $TD_1$ is thus switched from its low voltage state to its high voltage state, whereupon the conduction diode $D_1$ is again biased in a reverse direction and is caused to become nonconductive. The high voltage now present across the first tunnel diode $TD_1$ is coupled through the conduction diode $D_2$ to the positive terminal of the second tunnel diode $TD_2$ and through the capacitor $C_2$ to ground, with the result that the tunnel diode $TD_2$ is also switched from its low voltage state to its high voltage state. The positive-going voltage transition coupled through the conduction diode $D_2$ to tunnel diode $TD_2$ is also coupled, after a time delay, from the terminal 18 through the inductor $L_2$ and the delay line $DL_2$ to the negative terminal of the tunnel diode $TD_2$. When the voltage transition reaches the negative terminal of tunnel diode $TD_2$, diode $TD_2$ has already switched to its high voltage state, and the result is that both the positive and negative terminals of tunnel diode $TD_2$ are raised up by an amount equal to the increased voltage across tunnel diode $TD_1$ as the result of its switching from its low voltage state to its high voltage state. When the tunnel diode $TD_2$ switches to its high voltage state, the conduction diode $D_2$ is back biased and rendered nonconductive.

In similar manner, the increased voltage across tunnel diode $TD_2$ resulting from its switching to its high voltage state is coupled through the conduction diode $D_3$ to cause the tunnel diode $TD_3$ to switch to its high voltage state. After each of the tunnel diodes $D_2$ and $D_3$ is switched in sequence to its high voltage state, the voltage on both terminals of the tunnel diode are raised as the result of the switching of the preceding diodes to their high voltage states being coupled to the diode in question through the interposed inductor and delay line. When the last tunnel diode $TD_3$ has switched to its high voltage state, and when the switching to the high voltage states of the two preceding diodes has been felt at the negative terminal of tunnel diode $TD_3$, the output voltage at the output terminal 10 is substantially the sum of the high state voltages across all of the individual tunnel diodes.

The tunnel diodes remain in their high voltage states, which are stable states, until such time as the direct current bias +B is reduced sufficiently to force the diodes back to their low voltage states. The direct current bias applied to the terminal +B is represented as having a negative excursion 20 which causes the diodes to return to their low voltage states. When this occurs, the output voltage represented at 22 declines to the original value which is equal to the sum of the low voltages across the individual tunnel diodes when all of them are in their low voltage states. Following the reduction 20 of the +B bias, the bias is restored to its original value and the tunnel diodes remain in their low voltage states until they are again triggered by the next following input pulse.

The voltage multiplier circuit of FIGURE 2 is the same as the circuit of FIGURE 1 except that the +B bias terminal is connected through an inductor L to the direct current series circuit starting at junction point 16 of the three tunnel diodes. The value of the +B bias potential and the value of the inductor L are chosen in relation to the effective value of resistance in the circuit to provide monostable operation. Stated another way, the bias +B and the inductor L are selected so that the three tunnel diodes have stable operating points in their low voltage states. An input trigger pulse causes the three tunnel diodes to switch to their high voltage states. The diodes remain in their high voltage operating states for a period of time determined by the amount of energy stored in the inductor L, and the time constant of the circuit.

The circuits of FIGURES 1 and 2 are capable of another mode of operation wherein the first tunnel diode $TD_1$ is selected to have a lower peak current characteristic than the other tunnel diodes, and wherein the +B bias voltage has a gradually increasing amplitude such as may be provied by a sine wave. In this mode of operation, an input pulse is not applied to the input terminal, but the increasing +B bias voltage reaches a value causing the tunnel diode $TD_1$ to switch to its high voltage state. Thereafter, the circuit operates as though diode $TD_1$ were triggered by an input pulse. After all the tunnel diodes have switched to their high voltage states, they remain in the high states until the +B bias is reduced to a value which causes the diodes to switch back to their low voltage states.

FIGURE 3 shows another embodiment of the invention wherein the direct current conduction series circuit of the tunnel diodes may be traced from the +B terminal, through the bias resistor R, the tunnel diode $TD_3$, the delay line $DL_3$, the tunnel diode $TD_2$, the delay line $DL_2$ and the tunnel diode $TD_1$ to ground. The parallel connection of the tunnel diodes for the input pulse 24 applied to the input terminal 26 includes an input bus from which the input signal is applied in parallel through resistor $R_1$ and capacitor $C_1$ to tunnel diode $TD_1$, through resistor $R_2$, capacitor $C_2$ to tunnel diode $TD_2$ and through resistor $R_3$ and capacitor $C_3$ to tunnel diode $TD_3$. The tunnel diodes are normally biased from the +B terminal so that they are in their low voltage states. The voltage normally existing at the output terminal 30 is thus the sum of the individual voltages across the three tunnel diodes when the three tunnel diodes are in their low voltage states.

The input pulse 24 applied through the three parallel paths to the three tunnel diodes simultaneously shift or switch the tunnel diodes from their low voltage states to their high voltage states. Since the three tunnel diodes are simultaneously switched, it is required that the input pulse 24 be large enough to supply sufficient switching current to all the diodes simultaneously to switch them to their high voltage states. Therefore, the circuit of FIGURE 3 requires input pulse 24 of greater current amplitude than is required for triggering the circuits of FIGURES 1 and 2. The dynamic or alternating current means coupling the three tunnel diodes in parallel includes the delay lines which effectively connect the negative terminals of the corresponding tunnel diodes to ground so far as alternating current or dynamic conditions are concerned.

After an input pulse has been applied to the tunnel diodes in parallel and has caused them to be switched from their low voltage states to their high voltage states, they are operationally stable in their high voltage states and tend to remain in their high voltage states. The high voltage across the first tunnel diode $TD_1$ resulting from its switching to its high voltage state is coupled through the delay line $DL_2$ to the negative terminal of the second tunnel diode $TD_2$, causing both terminals of the tunnel diode $TD_2$ to be raised in potential by the amount of the voltage shift or change across tunnel diode $TD_1$. Similarly, the third tunnel diode $TD_3$ has both of its terminals raised in potential by an amount corresponding with the total change across both of the diodes $TD_1$ and $TD_2$ after a time delay determined by the delay lines $DL_2$ and $DL_3$. It is therefore apparent that shortly after the input trigger pulse is applied, the voltage at the output terminal 30 across all of the series connected tunnel diodes is equal to the sum of the individual voltages across the three tunnel diodes when they are in their high voltage states.

In the circuit of FIGURE 3, as is the case in the circuits of FIGURE 1, the output voltage at the output terminal 30 remains at the high voltage level until the +B bias potential is reduced sufficiently to cause at least one of the diodes to return to its low voltage state. When one of the diodes returns to its low voltage state, the others immediately follow. The circuit of FIGURE 3 may also be operated in the monostable mode after the fashion illustrated in FIGURE 2 by substituting an inductor for the resistor R, and suitably adjusting the value of the +B potential.

While all of the circuits of FIGURES 1, 2 and 3 have been described as including tunnel diodes normally biased in their low voltage states and being caused to switch to their high voltage states in response to the application of a positive input pulse, it will be understood that the circuits may also be operated in a manner such that the direct current bias causes the tunnel diodes to be normally in their high voltage states, and the diodes are caused to switch to their low voltage states in response to the application of a negative input pulse. In this case, it will be appropriate to reverse the polarities of the conduction diodes $D_1$, $D_2$ and $D_3$. It will also be understood that other polarity reversals involving the polarity of the tunnel diodes and the input pulses can be accomplished by those skilled in the art.

What is claimed is:

1. A voltage multiplier comprising a plurality of tunnel diodes, direct current conduction means connecting said tunnel diodes in series, said direct current conduction means including inductive elements interposed between adjacent tunnel diodes, means to apply a direct current bias to said diodes through said direct current conduction means to bias said diodes in the same one of their high and low voltage states, alternating current conduction means coupling said tunnel diodes in parallel, said alternating current conduction means including direct current blocking capacitors in series with at least all but one of said tunnel diodes, said alternating current conduction means also including conduction diodes interposed between corresponding terminals of adjacent tunnel diodes, means to apply a trigger pulse to one of said tunnel diodes in an amplitude sufficient to trigger said one tunnel diode to the other of its voltage states, whereby the changed state of the one tunnel diode causes a trigger pulse to be coupled to one terminal of the next adjacent tunnel diode through the interposed conduction diode before it can be coupled through the interposed inductive element to the other terminal of the tunnel diode, and so on until all tunnel diodes are switched to their other voltage state, and means to derive an output voltage from across said direct current conduction means connecting the tunnel diodes in series, said output voltage being substantially the sum of the voltages across the individual tunnel diodes.

2. A voltage multiplier comprising a plurality of tunnel diodes, direct current conduction means connecting said tunnel diodes in series, said direct current conduction means including inductive elements interposed between adjacent tunnel diodes, means to apply a direct current bias to said diodes through said direct current conduction means to bias said diodes in the same one of their high and low voltage states, alternating current conduction means coupling said tunnel diodes in parallel, said alternating current conduction means including direct current blocking capacitors in series with at least all but one of said tunnel diodes, said alternating current conduction means also including conduction diodes interposed between corresponding terminals of adjacent tunnel diodes, means to apply a trigger pulse to one of said tunnel diodes in an amplitude sufficient to trigger said one tunnel diode to the other of its voltage states, whereby the changed state of the one tunnel diode causes a trigger pulse to be coupled to one terminal of the next adjacent tunnel diode through the interposed conduction diode before it can be coupled through the interposed inductive element to the other terminal of the tunnel diode, and so on until all tunnel diodes are switched to their other voltage state, said conduction diodes being selected and poled so that each conduction diode is rendered non-conductive as soon as both tunnel diodes between which it is interposed have switched to their other voltage state, and means to derive an output voltage from across said direct current conduction means connecting the tunnel diodes in series, said output voltage being substantially the sum of the voltages across the individual tunnel diodes.

3. A voltage multiplier comprising a plurality of tunnel diodes, direct current conduction means connecting said tunnel diodes in series, said direct current conduction means including inductive elements interposed between adjacent tunnel diodes, means to apply a direct current bias to said diodes through said direct current conduction means to bias said diodes in the same one of their high and low voltage states, alternating current conduction means coupling said tunnel diodes in parallel, said alternating current conduction means including direct current blocking capacitors in series with at least all but one of said tunnel diodes, means to apply a trigger pulse through said alternating current conduction means to said tunnel diodes in an amplitude sufficient to trigger said tunnel diodes to the other of their voltage states, and means to derive an output voltage from across said direct current conduction means connecting the tunnel diodes in series, said output voltage being substantially the sum of the voltages across the individual tunnel diodes.

4. A voltage multiplier comprising a plurality of negative resistance diodes each having low and high voltage stable states and arranged in cascade between an input terminal to an output terminal, inductors connecting unlike terminals of adjacent diodes to form a direct current series circuit of diodes and interposed inductors, means to apply a direct current bias to the output terminal and through said series circuit to bias said diodes in the same one of their low and high voltage stable states, means to apply a trigger pulse to said input terminal, means to block the flow of said direct current bias between like terminals of adjacent diodes and to permit the coupling of said trigger pulse from said input terminal to like terminals of the diodes to cause said diodes to switch to the other one of their stable voltage states, and means to derive an output signal voltage from said output terminal which is substantially equal to the sum of the high voltages across the diodes.

5. A voltage multiplier as defined in claim 4 wherein said negative resistance diode is a tunnel diode.

6. A voltage multiplier comprising a plurality of tunnel diodes each having low and high voltage states and arranged in cascade between an input terminal to an output terminal, inductors connecting unlike terminals of adjacent tunnel diodes to form a direct current series circuit of tunnel diodes and interposed inductors, means to apply a direct current bias to the output terminal and through said series circuit to bias said tunnel diodes in their low voltage states, means to apply a trigger pulse to said input terminal, conduction diode and capacitor means connected to block the flow of said direct current bias between like terminals of adjacent tunnel diodes and to permit the coupling of said trigger pulse from said input terminal to like terminals of the tunnel diodes to cause said tunnel diodes to switch to their high voltage states, and means to derive an output signal voltage from said output terminal which is substantially equal to the sum of the high voltages across the tunnel diodes.

7. A voltage multiplier as defined in claim 6 wherein said means to apply a direct current bias includes a resistor so that the multiplied output voltage is maintained so long as the bias current is supplied.

8. A voltage multiplier as defined in claim 6 wherein said means to apply a direct current bias includes an inductor to provide monostable operation so that the multiplied output voltage has a duration determined by the values of the inductance and the values of other circuit elements.

9. A voltage multiplier comprising a plurality of tunnel diodes each having low and high voltage states and arranged in cascade, one of said diodes having a lower peak current than the others, inductors connecting unlike terminals of adjacent diodes to form a direct current series circuit of diodes and interposed inductors, means to apply an increasing direct current bias through said series circuit to cause said low peak current diode to switch to its high voltage state, means to block the flow of said direct current bias between like terminals of adjacent diodes and to permit the coupling of high state voltage on terminals of said low peak current diode to like terminals of the other diodes to cause the other diodes to switch to their high voltage states, and means to derive an output signal voltage from said output terminal which is substantially equal to the sum of the high voltages across the diodes.

References Cited in the file of this patent

UNITED STATES PATENTS

| | | |
|---|---|---|
| 2,944,164 | Odell et al. | July 5, 1960 |
| 3,051,846 | Schott | Aug. 28, 1962 |
| 3,053,999 | Baudin | Sept. 11, 1962 |